United States Patent
Martins et al.

(10) Patent No.: US 10,110,929 B2
(45) Date of Patent: Oct. 23, 2018

(54) METHOD OF PRE-PROCESSING DIGITAL IMAGES, AND DIGITAL IMAGE PREPROCESSING SYSTEM

(71) Applicant: AXIS AB, Lund (SE)

(72) Inventors: Alexandre Martins, Malmo (SE); Viktor Edpalm, Lund (SE); Xing Danielsson Fang, Lund (SE); Lars Persson, Malmo (SE); Fredrik Pihl, Malmo (SE)

(73) Assignee: Axis AB, Lund (SE)

( * ) Notice: Subject to any disclaimer, the term of this patent is extended or adjusted under 35 U.S.C. 154(b) by 35 days.

(21) Appl. No.: 15/246,951

(22) Filed: Aug. 25, 2016

(65) Prior Publication Data
US 2017/0064338 A1    Mar. 2, 2017

(30) Foreign Application Priority Data
Aug. 27, 2015   (EP) .................................. 15182692

(51) Int. Cl.
| | | |
|---|---|---|
| *H04N 5/232* | (2006.01) | |
| *H04N 19/85* | (2014.01) | |
| *G06T 5/00* | (2006.01) | |
| *H04N 19/172* | (2014.01) | |
| *H04N 19/134* | (2014.01) | |

(Continued)

(52) U.S. Cl.
CPC ............... *H04N 19/85* (2014.11); *G06T 5/00* (2013.01); *H04N 5/2257* (2013.01); *H04N 5/23229* (2013.01); *H04N 19/107* (2014.11); *H04N 19/117* (2014.11); *H04N 19/134* (2014.11); *H04N 19/162* (2014.11); *H04N 19/172* (2014.11); *H04N 19/426* (2014.11)

(58) Field of Classification Search
CPC ........... H04N 5/23251; H04N 5/23254; H04N 5/23258
USPC ............................................. 348/208.1, 208.2
See application file for complete search history.

(56) References Cited

U.S. PATENT DOCUMENTS

2005/0068429 A1*  3/2005  Kreiner ............ G08B 13/19606
                                                       348/231.6
2005/0185058 A1*  8/2005  Sablak ............... H04N 5/23248
                                                       348/208.99

(Continued)

FOREIGN PATENT DOCUMENTS

| EP | 0363209 A2 | 4/1990 |
| EP | 0520741 A1 | 12/1992 |

(Continued)

OTHER PUBLICATIONS

European Search Report for European Patent Application No. 15182692.2 dated Feb. 25, 2016.

(Continued)

*Primary Examiner* — Anthony J Daniels
(74) *Attorney, Agent, or Firm* — Volpe and Koenig, P.C.

(57) ABSTRACT

A method of pre-processing digital images captured by an image sensor for encoding is disclosed. The method comprises receiving a first digital image, receiving information representative of a movement of the image sensor at a time of capture of said first digital image), and pre-processing said first digital image. At least one parameter of said pre-processing is dependent on said information representative of movement. A digital image pre-processing system is also disclosed.

15 Claims, 6 Drawing Sheets

(51) Int. Cl.
*H04N 19/107* (2014.01)
*H04N 19/117* (2014.01)
*H04N 19/162* (2014.01)
*H04N 19/426* (2014.01)
*H04N 5/225* (2006.01)

(56) References Cited

U.S. PATENT DOCUMENTS

| | | | |
|---|---|---|---|
| 2007/0104272 A1* | 5/2007 | He | H04N 19/176 375/240.12 |
| 2009/0059017 A1* | 3/2009 | Kurokawa | H04N 5/145 348/208.1 |
| 2009/0147090 A1* | 6/2009 | Miki | H04N 5/23248 348/208.1 |
| 2010/0183071 A1 | 7/2010 | Segall | |
| 2013/0021483 A1* | 1/2013 | Bennett | H04N 19/56 348/208.4 |
| 2013/0076921 A1 | 3/2013 | Owen | |
| 2013/0342714 A1* | 12/2013 | Zhou | H04N 5/23258 348/208.2 |
| 2014/0240558 A1* | 8/2014 | Jacobs | H04N 5/3653 348/282 |
| 2017/0088098 A1 | 3/2017 | Frank et al. | |

FOREIGN PATENT DOCUMENTS

| | | |
|---|---|---|
| EP | 1679884 A1 | 7/2006 |
| EP | 2160015 A1 | 3/2010 |
| TW | 201503678 A | 1/2015 |
| WO | 2013/052383 A1 | 4/2013 |
| WO | 2013090097 A1 | 6/2013 |

OTHER PUBLICATIONS

Qixiang Ye et al., Text Detection and Recognition in Imagery: A Survey, IEEE Transactions on Pattern Analysis and Machine Intelligence, Jul. 2015, pp. 1480-1500, vol. 37, No. 7.

* cited by examiner

METHOD OF PRE-PROCESSING DIGITAL IMAGES, AND DIGITAL IMAGE PREPROCESSING SYSTEM

FIELD OF INVENTION

The present invention relates to the field of digital image processing, and more particularly to pre-processing of digital images in preparation for encoding.

BACKGROUND

In many uses of digital images, e.g., in monitoring systems, the digital images are compressed using various encoding schemes for transmission or storage. Before encoding, pre-processing of the digital images is performed. Pre-processing may for instance involve sharpening or noise filtering, in order to improve the quality of the images. However, a problem arises when the image sensor capturing the images moves during capture. Firstly, the ensuing changes in the images lead to a higher output bit rate from the encoder, because there is less temporal redundancy between the images. If bandwidth is very restricted, such as when transmitting over a mobile network, it may even be impossible to transmit video from a camera when fast movement causes increased bitrate. Additionally, the movement may make it computationally heavier to pre-process the image. On top of that, the pre-processing may add to the number of bits required for representing the images compared to a corresponding image captured when the image sensor is stationary. One solution to this problem is to freeze encoding of images during panning and/or tilting of a camera comprising the image sensor, and to resume encoding new input image frames only after movement has ceased. However, that means visual information is lost during movement, and an operator watching the transmitted image sequence may be disoriented. Thus, there is a need for an improved encoding approach.

SUMMARY

It is an object of the present invention to provide a method of pre-processing digital images for encoding, which allows a lower bitrate when the image sensor capturing the images is moving. Another object of the invention is to provide a method of pre-processing which makes it possible to avoid unnecessarily heavy computations when the image sensor is moving. A further object is to provide a method of pre-processing digital images for encoding, which enables visual information also during movement of the image sensor. Still another object is to provide a pre-processing method that may provide images with improved usability during movement of the image sensor.

It is also an object of the invention to provide a pre-processing system that may avoid unnecessarily high bitrate and unnecessarily high computational usage when the image sensor capturing the images is moving. Further, it is an object of the invention to provide a pre-processing system which may enable improved usability of images during movement of the image sensor.

An additional object is to provide a pre-processing system enabling provision of images also when the image sensor is moving.

Yet another object is to provide a computer program product that enables efficient bitrate also when the image sensor capturing the images is moving.

According to a first aspect, these objects are achieved, in full or at least in part, by a method of pre-processing digital images captured by an image sensor for encoding, comprising: receiving a first digital image, receiving information representative of a movement of the image sensor at a time of capture of said first digital image, and pre-processing said first digital image, wherein at least one parameter of said pre-processing is dependent on said information representative of movement. In this manner, pre-processing may be adapted such that the movement of the image sensor does not cause unnecessarily high bitrate. Thereby, images may be encoded and stored or transmitted for displaying also during periods of movement of the image sensor, without the cost of increased bitrate. Further, since the images captured during movement of the image sensor, e.g., during a fast panning movement, will generally be blurry, a loss of image quality possibly caused by modifying the pre-processing will have little impact on the usability of such images.

If the movement of the image sensor is above a predetermined threshold, said at least one parameter of said pre-processing may be modified such that the first digital image is less processed by said pre-processing than if the movement were equal to or below said threshold.

Further, said at least one parameter of said pre-processing may be modified such that at least one pre-processing procedure is disabled. For instance, sharpening may be dispensed with when the image sensor is moving, as the images would not really benefit from sharpening anyway.

According to another variant, said at least one parameter is modified such that at least one pre-processing procedure processes said first digital image, but to a greater or lesser extent. As an example, filtering may be applied to a greater degree. As a further example, tone mapping may be performed, but to a lesser degree.

According to yet another variant, said at least one parameter of said pre-processing is modified such that at least one pre-processing procedure that is otherwise disabled is enabled. For instance, blurring may be applied during movement of the image sensor, thereby making blocks of pixels in the images more or less homogeneous, which leads to lower bit requirement for representation of the image.

The pre-processing may comprise performing at least one pre-processing procedure chosen from the group consisting of sharpening, adding contrast, tone mapping, colour correction, spatial and/or temporal noise filtering, blurring, Bayer pattern sampling, demosaicing, HDR merging, controlling focus, controlling exposure, and controlling gain. It should be noted that, in the context of image sensor data, noise is sensor data that represents something that was not present in the scene. Noise may be temporal, i.e., varying from one image frame to the next, or spatial, i.e. differing from one pixel to another within the same frame. There are various sources of noise. Temporal noise may, e.g., be reset noise, thermal noise, flicker noise, dark current shot noise, quantisation noise or phase noise. Spatial noise may, e.g., be dark fixed-pattern noise, light fixed-pattern noise, leaker noise, defect pixel noise or cosmetic defect noise.

The information representative of a movement of the image sensor may be provided by a pan, tilt and/or zoom controller controlling movement of said image sensor. In this manner, adaptation of the pre-processing may be made in view of intentional movement of the image. It may here be noted, that zooming does not in itself imply a movement of the image sensor. However, for purposes of encoding images, zooming will induce changes in the captured images analogous to actual movement of the image sensor. Therefore, in the context of this application, a zoom operation will be seen as equivalent to a movement of the image sensor.

The information representative of a movement of the image sensor may be provided by a motion sensor. Hereby, undesired movement caused by shaking may be taken into account. Information from the motion sensor may also be used for providing information on pan, tilt and/or zoom operations.

According to a variant of the method, said at least one parameter is modified gradually in preparation for a planned movement of the image sensor. In this manner, e.g., harder noise filtering may be added gradually leading up to a planned movement, or sharpening may be gradually decreased. Thereby, abrupt changes in the appearance of the images may be avoided.

The method may further comprise encoding said first digital image as an intra-frame in preparation for a planned movement of the image sensor. If there is movement in the captured images, inter-frames will become larger, due to larger differences between frames. At some point, the differences will be large enough that an intra-frame, not relying on other image frames for its encoding, will be more efficient. If it is known that there will be movement, an intra-frame can be forced, such that unnecessarily large inter-frames may be avoided. By forcing, or inserting, an intra-frame, the encoded frame may have higher quality, as may subsequent images encoded as inter-frames with reference to that intra-frame. The subsequent inter-frames may also require fewer bits because of having a more suitable reference frame.

According to a second aspect, the above-mentioned objects are achieved, in full or at least in part, by a digital image pre-processing system for pre-processing input images captured by an image sensor for encoding, the system comprising: an image receiving module arranged to receive input images, a movement information receiving module arranged to receive information representative of a movement of the image sensor at a time of capture of said first digital image, and a pre-processing module arranged to pre-process the input images before encoding, wherein at least one parameter of said pre-processing is dependent on said information representative of movement. By means of such a system, it may be possible to provide images during movement of the image sensor, without the cost of unnecessarily high output bitrates.

The pre-processing module may be arranged to perform at least one pre-processing procedure chosen from the group consisting of sharpening, adding contrast, tone mapping, colour correction, temporal and/or spatial noise filtering, blurring, Bayer pattern sampling, demosaicing, HDR merging, controlling focus, controlling exposure, and controlling gain.

In an embodiment of the digital image pre-processing, the movement information receiving module is communicatively connected to a pan, tilt and/or zoom controller controlling movement of said image sensor. Thereby, information on intentional movement may be provided.

Alternatively or additionally, the movement information receiving module may be communicatively connected to a motion sensor. As discussed in connection with the method, information on unintentional as well as intentional movement may thereby be provided.

According to a third aspect, the above-mentioned objects are achieved, in full or at least in part, by a camera comprising a pre-processing system according to the second aspect. Such a camera may generally be embodied in the same ways as the second aspect, with accompanying advantages.

According to a fourth aspect, the above-mentioned objects are achieved, in full or at least in part, by a computer program product comprising a computer-readable storage medium with instructions adapted to carry out the method according to the first aspect when executed by a processor. The processor may be any kind of processor, e.g., a central processing unit (CPU), a graphics processing unit (GPU), a custom made processing device implemented in an integrated circuit, an ASIC, an FPGA, or logical circuitry including discrete components. The computer-program product may generally be varied in the same ways as the first aspect with accompanying advantages.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWING(S)

The invention will now be described in more detail by way of example and with reference to the accompanying schematic drawings, in which.

DETAILED DESCRIPTION OF THE PREFERRED EMBODIMENT(S)

Figure 1:
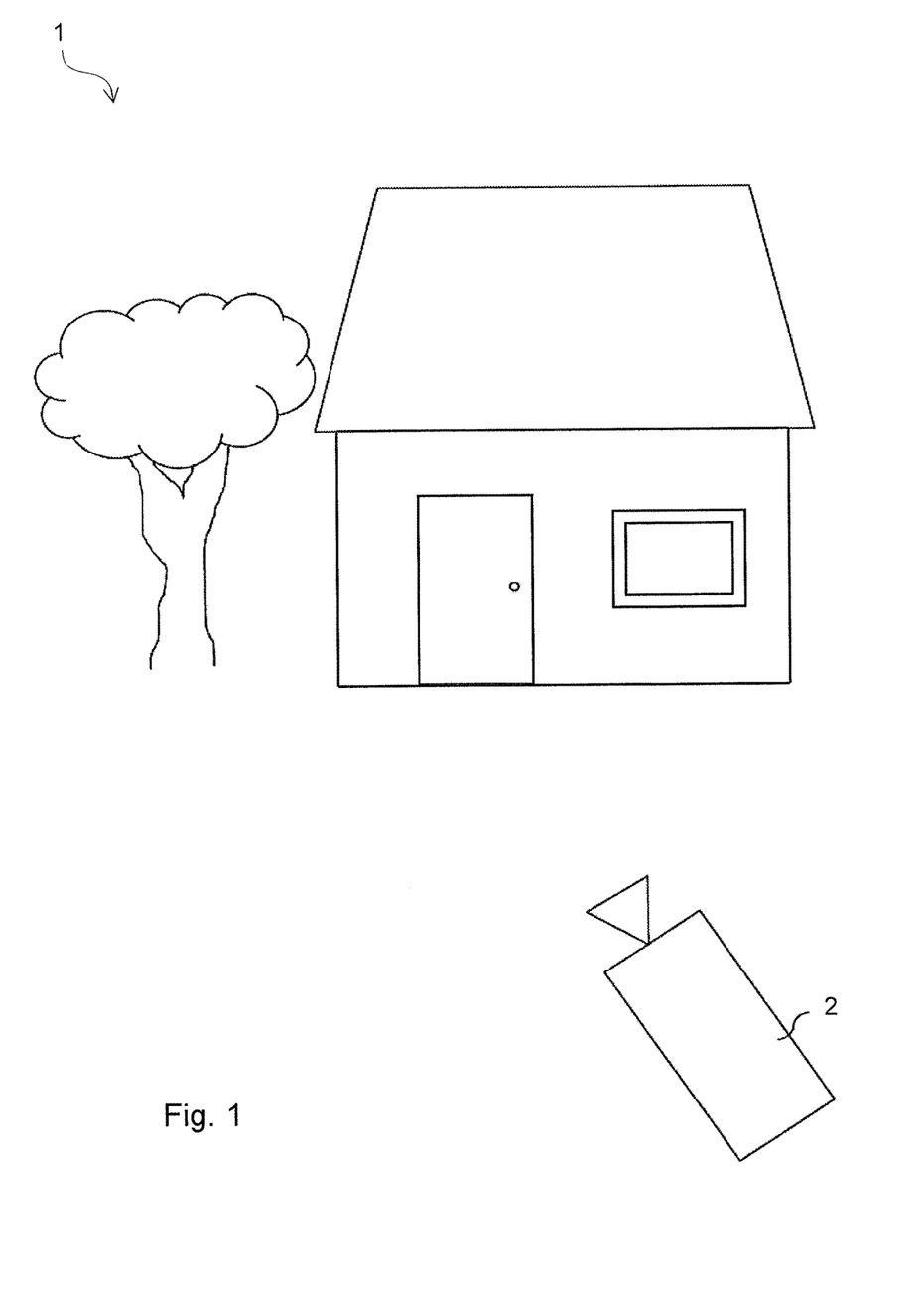
FIG. 1 is an illustration of a scene being monitored by a camera.
Figure 2:
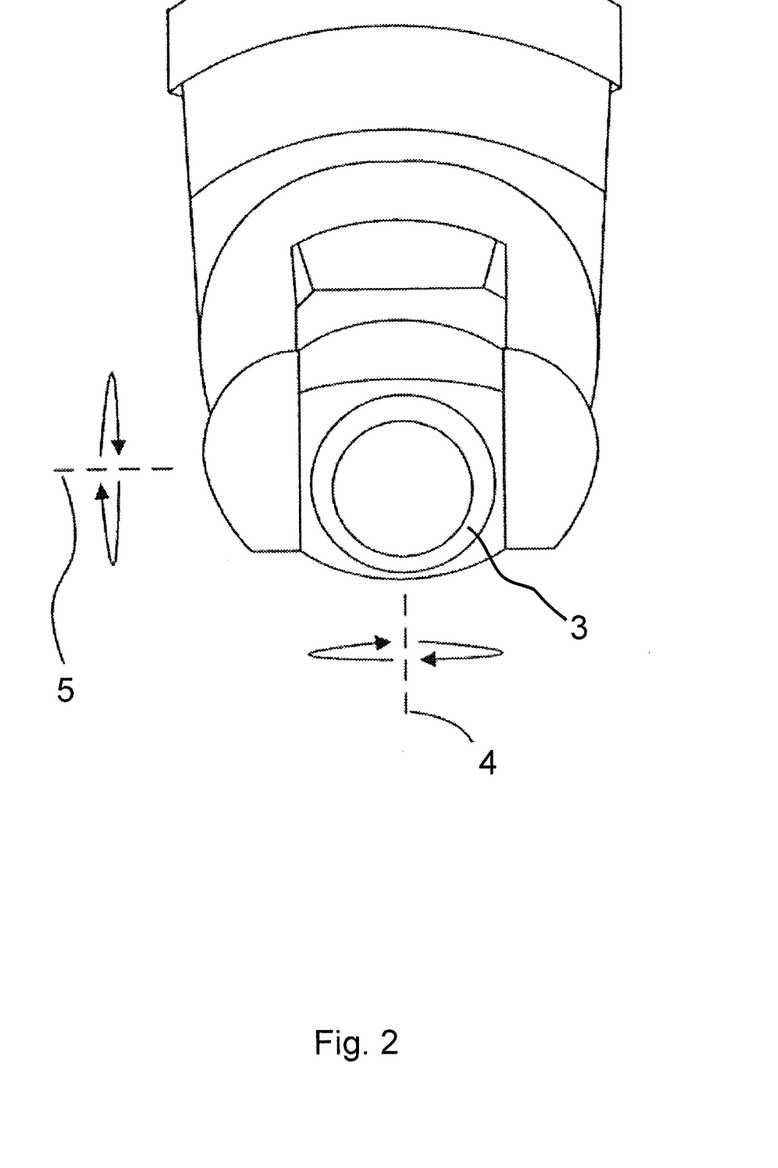
FIG. 2 is a front view of a camera with pan/tilt/zoom capability.

In FIG. 1, a scene 1 is shown, which is monitored by a camera 2. An example of a camera 2 is shown in FIG. 2. This camera 2 has an image sensor (not shown in FIG. 2) and a lens 3. The camera 2 is a so called pan-tilt-zoom (PTZ) camera with capability to pan around a pan axis 4 and to tilt around a tilt axis 5. The camera 2 is also capable of zooming.

Figure 3:
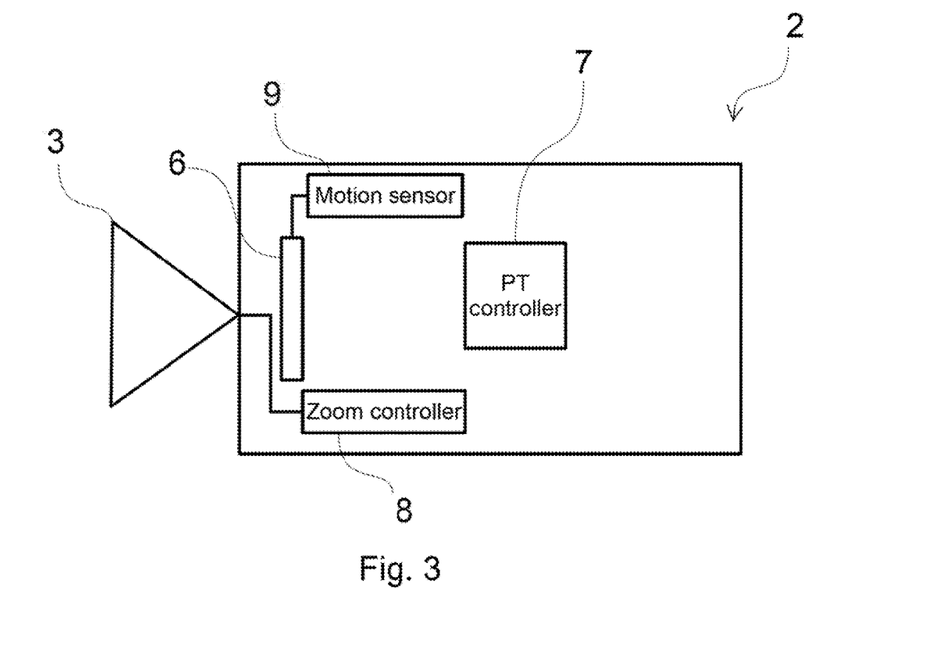
FIG. 3 is a block diagram of the camera of FIG. 2.

FIG. 3 is a block diagram showing some of the components of the camera 2. Here, an image sensor 6 arranged to capture images may be seen, as well as a PT controller 7 for controlling panning and tilting of the camera 2. Further, the camera 2 has a zoom controller 8 for controlling zooming. The camera 2 will also have additional components, known in the art, which are not relevant for the invention, and which will therefore not be shown or discussed here.

Figure 4:
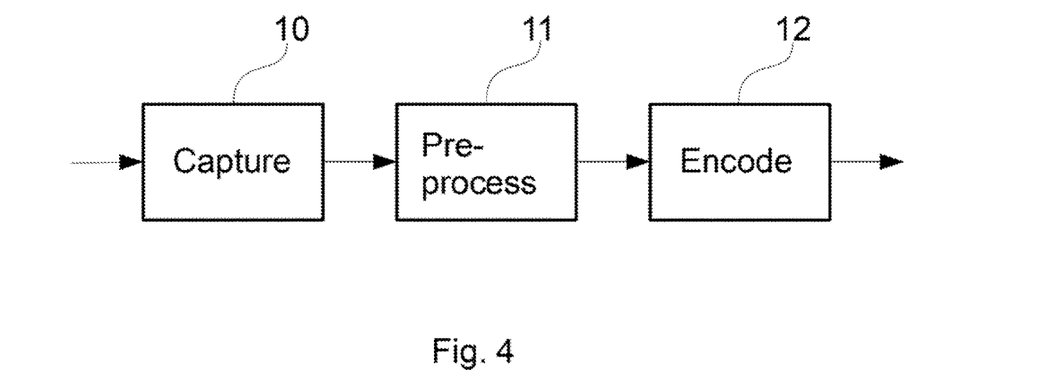
FIG. 4 is a block diagram showing some functions in a process of capturing, pre-processing and encoding images.

The basic principles of a process for capturing and encoding images of the scene 1 with the camera 2 will now be described with reference to FIG. 4. Light from the scene 1 enters the camera 2 through the lens 3 and is captured 10 by the image sensor. The data from the image sensor 6 is in the form of grey scale intensities, generally with each pixel being represented by a respective digital value. The captured image, or more specifically the data representing the image, then undergoes pre-processing 11. Pre-processing 11 may involve one or more pre-processing procedures, such as Bayer pattern sampling, demosaicing, sharpening and tone mapping. The pre-processing procedures generally aim at providing a higher quality or more usable image. The pre-processed image is thereafter ready for encoding 12. Encoding may be done according to any compression format.

If the camera 2 moves during capture of a video sequence, be it because of a planned or spontaneous intentional panning, tilting or zooming operation or because of unintentional vibrations, the images may become blurry. Further, the movement leads to increased bitrates for representing images, since there is less redundancy between images of a moving scene than between images of a static scene. The increased bitrate may be too high for transmitting video if bandwidth is very restricted, such as on a mobile network, thereby making it impossible to transmit any images, e.g., during fast panning or tilting movements of the camera. As mentioned above, the bitrate problem is sometimes dealt with by freezing an image during panning, tilting and/or zooming. In this manner, no images are pre-processed and encoded during movement, thereby leading to a lower bitrate. However, such an approach means that the operator is provided with less or no visual information during movement. The operator therefore has little chance of noting suspicious objects or behaviour occurring in areas of the scene that are transitioned during movement. The lack of visual information during movement may also lead to disorientation, since the operator is only provided with images of the start position of the movement and of the end position of the movement, and none there between. These problems are the same for live display of video sequences as for recorded video sequences.

According to the invention, images should not be frozen during movement of the camera. Although this may lead to higher bitrate, the visual information available during movement may be worth it. However, the inventors have realised that part of the bitrate increase may be avoided by modifying the pre-processing applied before encoding.

For instance, sharpening works by increasing differences in the image, may thereby also lead to increased noise. The differences and noise, in turn, lead to higher bitrates when encoding the sharpened image. By reducing or even disabling sharpening during movement of the camera, or more precisely the image sensor, the increase in bit rate may be curbed.

Similarly, tone mapping used for improving the dynamic range of an image adds differences in the bright and dark areas of the image and may add noise, thereby increasing bitrate. Disabling tone mapping during movement may inhibit part of the bitrate increase.

In the same way, other pre-processing procedures that would otherwise add to the bitrate may be disabled or applied to a lesser extent. Intuitively, this will lower the image quality, but since images captured during movement of the camera are generally blurry, the lowered image quality will in most cases not be of any concern to the operator. Further, during fast movement, the images may not even benefit from pre-processing.

Reduction or disabling of sharpening may even be taken as far as actually adding blur during movement of the camera. Thus, instead of increasing differences in the image, differences may be reduced, e.g., by calculating an average luminance value of a block or group of pixels and using that as the luminance value of all pixels in that block. In this manner pixel values are "smeared" over areas of the image.

Some pre-processing procedures may be modified during movement of the camera although not thereby contributing to the goal of lowering bitrate, but actually improving image quality or image usability. Some cameras improve the dynamic range in the images by capturing two successive images within a short period of time. For one of the images a low exposure is used, resulting in an image where bright areas of the scene may be scene clearly, but where dark areas lack details and are more or less completely black. For the other image a high exposure is used, resulting in an image where the bright areas are overexposed or saturated, appearing completely white, and where the dark areas show details. By selectively using areas of one or the other image, a merged image is produced in which both dark and bright areas of the scene may be shown in detail. Such pre-processing procedures are referred to as HDR (high dynamic range) merging or WDR (wide dynamic range) merging. For such merging to give a good result, the two differently exposed images have to be captured with such short time between them that they show the same scene, or else objects moving in the scene between the two captures will appear blurry. However, if the camera is moving it might not be possible to capture the two images sufficiently close together in time for them to actually show the same scene. The entire image may therefore appear blurry. In order to remedy this problem, HDR merging may be disabled during movement of the camera. Thus, only one of the two differently exposed images may be encoded, or capturing of two differently exposed images may be disabled, such that just one image is captured and encoded.

Image or video statistics, such as luminance values, chromaticity values, variance of luminance and/or chromaticity, motion information, autofocus values, moving object counter, bitrate, or filter parameters, gathered over time during a video sequence, may be reset when movement of the image sensor is determined. In this way, the movement will not corrupt the statistics.

In order to ascertain that a modification of one or more of the pre-processing procedures should be made, information on movement of the camera 2, or more precisely the image sensor 6, is obtained. This information may be provided by the PT controller 7, which has this information anyway for controlling panning and tilting of the camera 2. Similarly, such information may be provided by the zoom controller 8. The camera 2 may also have a motion sensor 9, e.g., an accelerometer, which senses movement of the image sensor. The motion sensor 9 may provide information on movement of the image sensor 6 when the camera 2 is unintentionally vibrating or shaking. It may also provide information on intentional movement of the image sensor 6 in addition to or instead of the PT controller 7.

As already discussed, the movement may be a desired movement or an undesired movement. Desired movements may, e.g., be controlled using an input device such as a joystick. Desired movements may also be planned and pre-programmed as so called guard tours. Undesired movements may, e.g., be vibrations caused by wind or traffic, or by insufficient fixing of the camera.

If a movement of the camera is planned, it is possible to make modifications of one or more pre-processing procedures in preparation for the movement. For instance, temporal noise filtering may be modified such that filtering is gradually made more severe, and may then be kept at an increased level until the end of the movement. An increased noise filtering may lead to loss of details in the pre-processed image, but again, during movement of the camera, this will in most cases not be of concern for the usability of the images. Filtering may be done temporally as well as spatially. One or both of these two types may be used, and a balance there between may be modified during movement, such that more or only temporal filtering is done when the image sensor is stationary, and more or only spatial filtering is done when the image sensor is moving.

In preparation of a planned movement, encoding may also be modified. If it is known that the camera will move, it is implicitly known that there will be apparent movement in images, leading to larger inter-frames. When movement starts, an intra-frame may therefore be forced, thereby providing a better reference for subsequent inter-frames.

Figure 5:
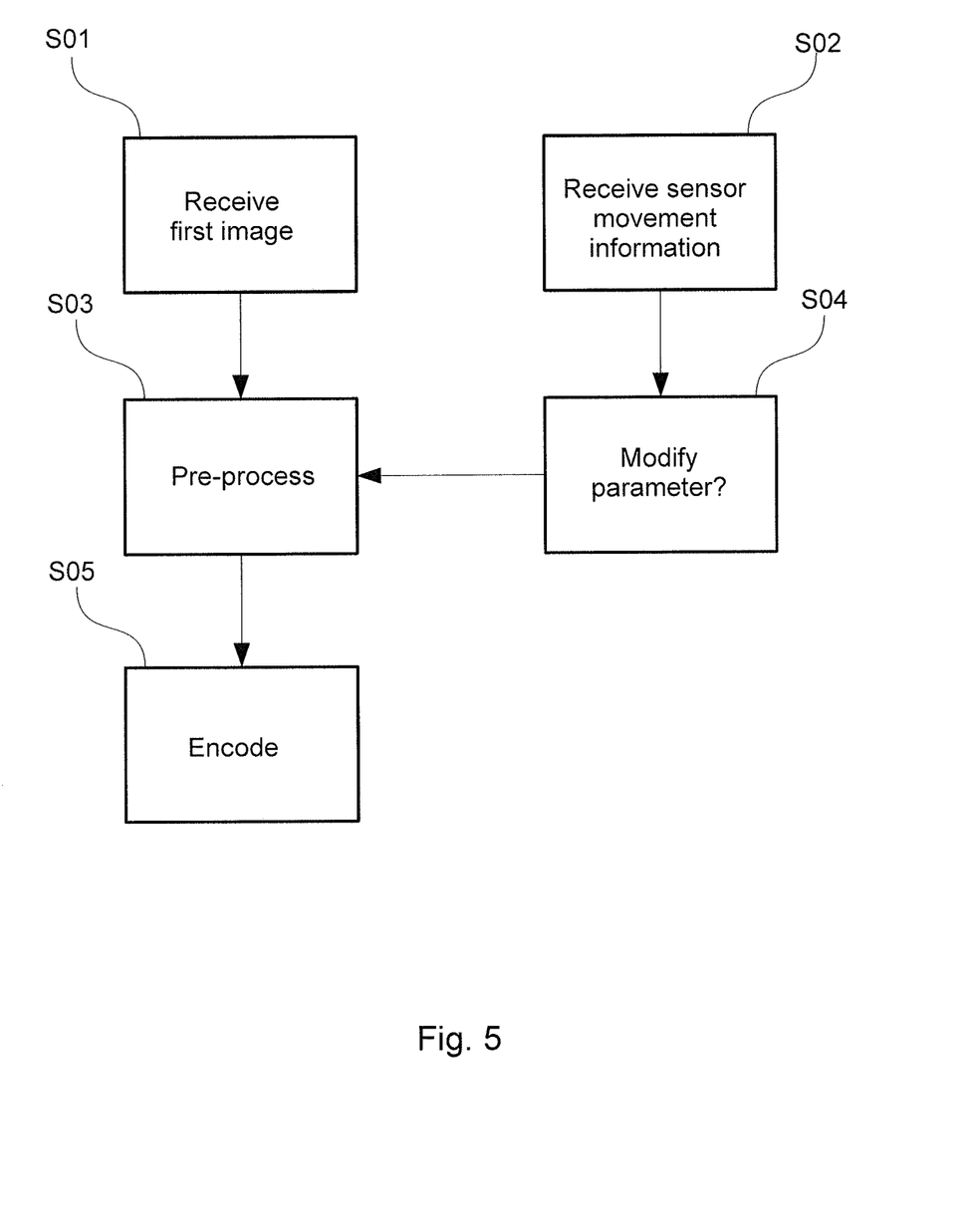
FIG. 5 is a flow chart of a method of pre-processing digital images.

With reference to FIG. 5, the method will now be described in more general terms. A first digital image is received (step S01) and information representative of a movement of the image sensor at a time of capture of the first image is received (step S02). The first digital image is pre-processed (step S03). Based on the information representative of movement, it is decided if and how one or more parameters of the pre-processing is to be modified (step S04). For instance, the movement may be compared to a predetermined threshold, and if the movement is above that threshold, one or more pre-processing procedures are disabled, enabled or otherwise modified.

The pre-processing may be modified based on information representative of movement received for a previous image, such that a movement of the image sensor will affect the pre-processing only of subsequently captured images. For some pre-processing procedures, parameters may be modified immediately, such that a movement of the image sensor will affect the pre-processing of the image for which the information representative of movement of the image sensor was received, and possibly also of subsequently captured images.

After pre-processing (S03), the first image is encoded (step S05), such that it may be transmitted and/or stored.

Figure 6:
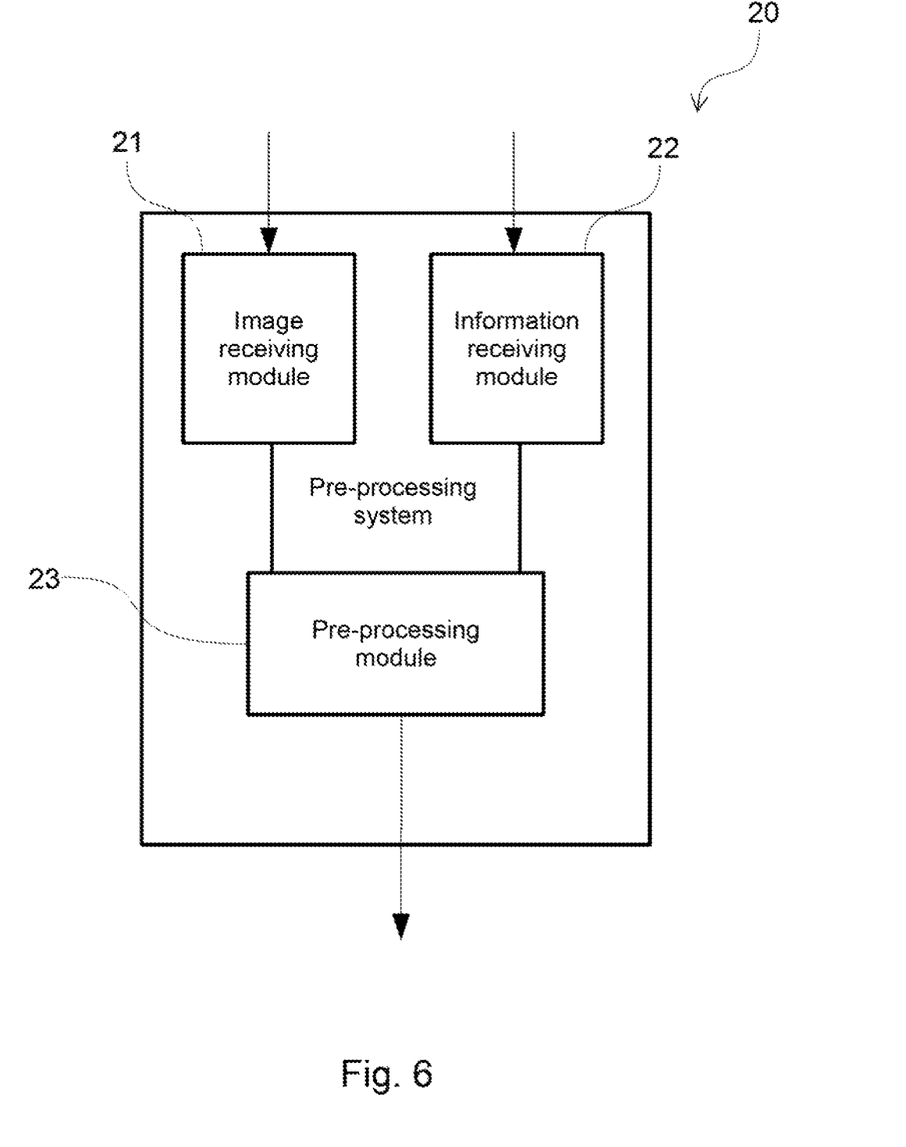
FIG. 6 is a block diagram of an embodiment of a digital image pre-processing system.
Figure 7:
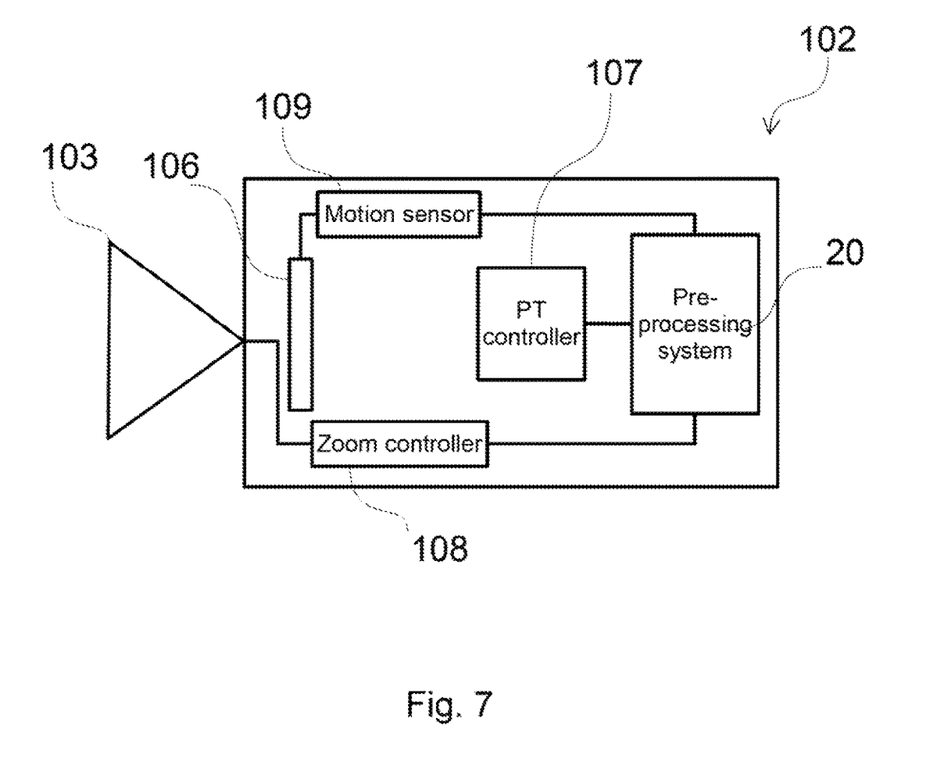
FIG. 7 is a block diagram of a camera incorporating a digital image pre-processing system.

In FIG. 6 an embodiment of a digital image pre-processing system 20 is shown. The system 20 has an image receiving module 21, which is arranged to receive input images, and a movement information receiving module 22, which is arranged to receive information representative of a movement of the image sensor at a time of capture of the input images. Further, the system 20 has a pre-processing module 23 arranged to pre-process the input images. At least one parameter of the pre-processing is dependent on the information representative of movement of the image sensor. After pre-processing, the images may be encoded by an encoder (not shown). The encoder may be integrated in the pre-processing system 20, or it may be separate from the pre-processing system 20. The pre-processing system 20 may be integrated in a camera, such as the camera 102 schematically shown in FIG. 7. In FIG. 7, components of the camera 102 that are the same as in the camera 2 shown in FIG. 3 are indicated with the same reference numerals, but with the addition of one hundred, and will not be discussed further here.

Alternatively, the pre-processing system 20 may be a separate unit, operatively connected to a camera, such as the camera 2 in FIG. 3.

The pre-processing system may be embodied as hardware, firmware, software, or a combination thereof.

It will be appreciated that a person skilled in the art can modify the above described embodiments in many ways and still use the advantages of the invention as shown in the embodiments above. As an example, a couple of pre-processing procedures have been mentioned, but the invention is equally applicable to other pre-processing procedures applied in preparation for encoding a digital image, e.g., adding contrast, colour correction, Bayer pattern sampling, demosaicing or controlling gain. It will be understood that pre-processing procedures that tend to add noise may be reduced or disabled in order to lower the output bitrate, whereas pre-processing procedures that tend to reduce noise may be enabled or increased to the same end.

In connection with FIG. 3, the PTZ controller is described as one controller for panning and tilting and one for zooming. However, it may as well be made up of separate controllers for each of panning, tilting and zooming, respectively, or of one common controller for panning, tilting and zooming.

The predetermined threshold against which the movement of the image sensor is compared may be pre-programmed or set by user input.

Instead of using just one threshold, a plurality of thresholds may be used. For instance, if movement is above a first, low threshold, one or more pre-processing procedures may be reduced, and if movement is above a second, higher threshold, these pre-processing procedures may be disabled. A parameter of the pre-processing may depend on the movement, e.g., as a linear function. Thus, with increasing movement, the parameter may be gradually decreased. As an example, if the camera is slowly panning or tilting, sharpening may be slightly reduced, and if the camera is moving more quickly, sharpening may be more severely reduced or even disabled, the sharpening thus being dependent on the movement level.

The pre-processing system may be embodied as software, firmware, hardware, or a combination thereof.

The pre-processing module of the pre-processing system may be arranged to perform all the pre-processing procedures to be applied on the images. Alternatively, the pre-processing module may be divided into several submodules, independent or cooperating, each performing just one or a few pre-processing procedures.

In the examples above, the invention is described in connection with a camera. The camera may be a monitoring camera. Further, the camera may be any type of camera, e.g., a camera employing visible light, an IR camera or a thermal camera. The camera may be a digital camera, but the invention may also be used with analogue cameras. In such case, images from an analogue camera may be converted to digital format using a digitalisation unit.

Instead of in a camera, the image sensor capturing the image frames may be arranged in another type of image capturing device.

The images may also be generated by a visual light sensor, a thermal sensor, a time-of-flight sensor, or other types of image generating sensors.

Thus, the invention should not be limited to the shown embodiments but should only be defined by the appended claims.

What is claimed is:

1. A method of pre-processing digital images captured by an image sensor for encoding, comprising:
   receiving a first digital image,
   receiving information representative of a movement of the image sensor at a time of capture of said first digital image,
   modifying at least one parameter of pre-processing of the digital image based on said information representative of movement,
   pre-processing said first digital image according to the at least one modified parameter to generate a pre-processed image,
   wherein the modifying causes a bitrate of the pre-processed image when encoded to be lower than a bitrate of a pre-processed image that would be generated by applying the pre-processing without the modified parameter and when encoded.

2. The method according to claim 1, wherein if said movement of the image sensor is above a predetermined threshold, said at least one parameter of said pre-processing is modified such that the first digital image is less processed by said pre-processing than if said movement were equal to or below said threshold.

3. The method according to claim 2, wherein said at least one parameter of said pre-processing is modified such that at least one pre-processing procedure is disabled.

4. The method according to claim 2, wherein said at least one parameter is modified such that at least one pre-processing procedure processes said first digital image, but to a greater or lesser extent.

5. The method according to claim 1, wherein said at least one parameter of said pre-processing is modified such that at least one pre-processing procedure that is otherwise disabled is enabled.

6. The method according to claim 1, wherein said pre-processing comprises performing at least one pre-processing procedure chosen from the group consisting of sharpening, adding contrast, tone mapping, colour correction, noise filtering, blurring, Bayer pattern sampling, demosaicing, HDR merging, controlling focus, controlling exposure, and controlling gain.

7. The method according to claim 1, wherein said information representative of a movement of the image sensor is provided by a pan, tilt and/or zoom controller controlling movement of said image sensor.

8. The method according to claim 1, wherein said information representative of a movement of the image sensor is provided by a motion sensor.

9. The method according to claim 1, wherein said at least one parameter is modified over a plurality of frames in preparation for a planned movement of the image sensor.

10. The method according to claim 1, further comprising encoding said first digital image as an intra-frame in preparation for a planned movement of the image sensor.

11. A computer program product comprising a computer-readable storage medium with instructions adapted to carry out the method according to claim 1 when executed by a processor.

12. A digital image pre-processing system for pre-processing input images captured by an image sensor for encoding, the system comprising:
   an image receiving module arranged to receive input images;
   a movement information receiving module arranged to receive information representative of a movement of the image sensor at a time of capture of said input images; and
   a pre-processing module arranged to modify at least one parameter of pre-processing of the input images based on said information representative of movement, and to pre-process the input images before encoding to generate pre-processed images,
   wherein the modifying causes bitrates of the pre-processed images when encoded to be lower than bitrates of pre-processed images that would be generated by applying the pre-processing without the modified parameter and when encoded.

13. The digital image pre-processing system according to claim 12, wherein said pre-processing module is arranged to perform at least one pre-processing procedure chosen from the group consisting of sharpening, adding contrast, tone mapping, colour correction, noise filtering, blurring, Bayer pattern sampling, demosaicing, HDR merging, controlling focus, controlling exposure, and controlling gain.

14. The digital image pre-processing system according to claim 12, wherein said movement information receiving module is communicatively connected to a pan, tilt and/or zoom controller controlling movement of said image sensor and/or to a motion sensor.

15. A camera comprising a pre-processing system according to claim 12.

* * * * *